United States Patent
Wu

(10) Patent No.: US 10,884,129 B2
(45) Date of Patent: Jan. 5, 2021

(54) DETECTING SYSTEM FUSING LIDAR POINT CLOUD AND IMAGE

(71) Applicant: Tsinghua University, Beijing (CN)

(72) Inventor: Guanhao Wu, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 16/636,062

(22) PCT Filed: Dec. 6, 2017

(86) PCT No.: PCT/CN2017/114833
§ 371 (c)(1),
(2) Date: Feb. 3, 2020

(87) PCT Pub. No.: WO2019/024370
PCT Pub. Date: Feb. 7, 2019

(65) Prior Publication Data
US 2020/0379114 A1 Dec. 3, 2020

(30) Foreign Application Priority Data
Aug. 4, 2017 (CN) .......................... 2017 1 0661426

(51) Int. Cl.
*G01S 17/87* (2020.01)
*G01S 7/481* (2006.01)
*G01S 17/89* (2020.01)
*G01S 17/42* (2006.01)
*G01S 17/86* (2020.01)

(52) U.S. Cl.
CPC ............. *G01S 17/86* (2020.01); *G01S 7/4811* (2013.01); *G01S 17/42* (2013.01); *G01S 17/87* (2013.01); *G01S 17/89* (2013.01)

(58) Field of Classification Search
CPC ........ G01S 17/86; G01S 17/89; G01S 7/4811; G01S 17/87; G01S 17/42
USPC ....................................................... 356/4.01
See application file for complete search history.

(56) References Cited

U.S. PATENT DOCUMENTS 4,515,471 A   5/1985   Eden

FOREIGN PATENT DOCUMENTS

| CN | 101975942 | 2/2011 |
|---|---|---|
| CN | 103471715 | 12/2013 |
| CN | 104483676 | 4/2015 |
| CN | 105093235 | 11/2015 |

(Continued)

*Primary Examiner* — Daniel L Murphy
(74) *Attorney, Agent, or Firm* — Occhiuti & Rohlicek LLP

(57) ABSTRACT

The present disclosure relates to a detecting system fusing lidar point cloud and image, which includes a laser emitting means (101), a beamsplitter (102), a beam deflecting means (103), a first laser detecting means (104), a coaxial optical receiving means (105), a second laser detecting means (106) and an image detecting means (107). By using the coaxial optical receiving means, a third return light received by the second laser detecting means and a fourth return light received by the image detecting means are both from a first return light which includes a reflected light generated by the second laser beam irradiating a target object and a reflected light generated by a background illuminating light source irradiating the target object. The system may acquire lidar point cloud information and image information synchronously, which facilitates the subsequent fusion of the lidar point cloud information and the image information and reduces the complexity of calculation.

9 Claims, 3 Drawing Sheets

(56) References Cited

FOREIGN PATENT DOCUMENTS

| | | |
|---|---|---|
| CN | 107219533 | 9/2017 |
| EP | 0349343 | 1/1990 |

DETECTING SYSTEM FUSING LIDAR POINT CLOUD AND IMAGE

CROSS-REFERENCE TO RELATED APPLICATION

This application is a U.S. national stage application of the PCT International Application No. PCT/CN2017/114833 filed on Dec. 6, 2017, which claims the benefit of foreign priority of Chinese Patent Application No. 201710661426.5, filed on Aug. 4, 2017, the entire contents of which are incorporated herein by reference.

TECHNICAL FIELD

The disclosure relates to the technical field of lidar, in particular to a detecting system fusing lidar point cloud and image.

BACKGROUND

The pulse 3D (three-dimensional) lidar based on the time-of-flight method has characteristics such as long-distance measurement, high repetition frequency and low power consumption due to adopting pulsed laser as a light source, and is widely applied to the fields of three-dimensional modeling, environment perception and the like. However, the lateral resolution of the laser detecting means in the lidar system is relatively low, and the image sensing device does not have the ability to form images in three dimensions directly although it has a high lateral resolution for acquiring two-dimensional images. In the prior art, the lidar point cloud data and the image data are usually fused after being respectively acquired, but the method of fusing the lidar point cloud data and the image data based on the image processing algorithm has a high demand on the density of the lidar point cloud data and is complex in algorithm.

SUMMARY

In view of this, the present disclosure provides a detecting system fusing lidar point cloud and image.

According to an aspect of the present disclosure, there is provided a detecting system fusing lidar point cloud and image, comprising: a laser emitting means configured to emit a first laser beam to a beamsplitter; the beamsplitter configured to divide the first laser beam into a second laser beam and a third laser beam, the second laser beam traveling towards a beam deflecting means and the third laser beam traveling towards a first laser detecting means; the beam deflecting means configured to deflect a direction of the second laser beam so that the second laser beam travels towards a target object, and further configured to deflect a direction of a first return light so that the first return light travels towards the beamsplitter, passes through the beamsplitter and forms a second return light which travels towards a coaxial optical receiving means, wherein the first return light includes a reflected light generated by the second laser beam irradiating the target object and a reflected light generated by a background illuminating light source irradiating the target object, and the background illuminating light source includes one or more natural light sources and/or artificial light sources; the first laser detecting means configured to receive the third laser beam and generate initial light information; the coaxial optical receiving means configured to receive the second return light, a part of which is deflected by the coaxial optical receiving means and forms a third return light which travels towards a second laser detecting means, and another part of which passes through the coaxial optical receiving means and forms a fourth return light which travels towards an image detecting means; the second laser detecting means configured to receive the third return light from the coaxial optical receiving means and generate reflected light information; and the image detecting means configured to receive the fourth return light from the coaxial optical receiving means and generate image information.

In a possible implementation, a laser detecting field of view coincides with an image detecting field of view, the laser detecting field of view is a range of the target object detectable by the second laser detecting means, and the image detecting field of view is a range of the target object detectable by the image detecting means.

In a possible implementation, the coaxial optical receiving means includes a beamsplitter cube, a part of the second return light being deflected by the beamsplitter cube and forming the third return light, and another part of the second return light passing through the beamsplitter cube and forming the fourth return light.

In a possible implementation, the system further includes a light processing means provided between the beamsplitter and the coaxial optical receiving means and configured to perform processing on the second return light passing through the beamsplitter, wherein the processing includes at least one of amplification, denoising and beam shaping.

In a possible implementation, the beam deflecting means includes a galvanometer scanner.

In a possible implementation, the beam deflecting means includes a mechanical rotating mirror.

In a possible implementation, the beam deflecting means includes an active mirror.

In a possible implementation, the laser emitting field of view is greater than or equal to the laser detecting field of view and/or the image detecting field of view, the laser emitting field of view being a range where the second laser beam is irradiated to the target object.

In a possible implementation, the first laser beam is emitted by a pulsed laser.

In a possible implementation, the second laser detecting means includes a linear-array laser detector and the image detecting means includes a linear-array image sensor.

By using the coaxial optical receiving means, the third return light received by the second laser detecting means and the fourth return light received by the image detecting means are both from the first return light including the reflected light generated by the second laser beam irradiating the target object and the reflected light generated by the background illuminating light source (such as natural light source or artificial light source) illuminating the target object. In other words, the system can acquire the lidar point cloud information and the image information synchronously, which facilitates a subsequent fusion of the lidar point cloud information and image information and reduces the complexity of calculation.

Other features and aspects of the present disclosure will become apparent from the following detailed description of exemplary embodiments with reference to the accompanying drawings.

BRIEF DESCRIPTION OF THE DRAWINGS

The accompanying drawings, which are incorporated in and constitute a part of the specification, together with the description, illustrate exemplary embodiments, features and aspects of the present disclosure and serve to explain principles of the present disclosure.

Figure 1:
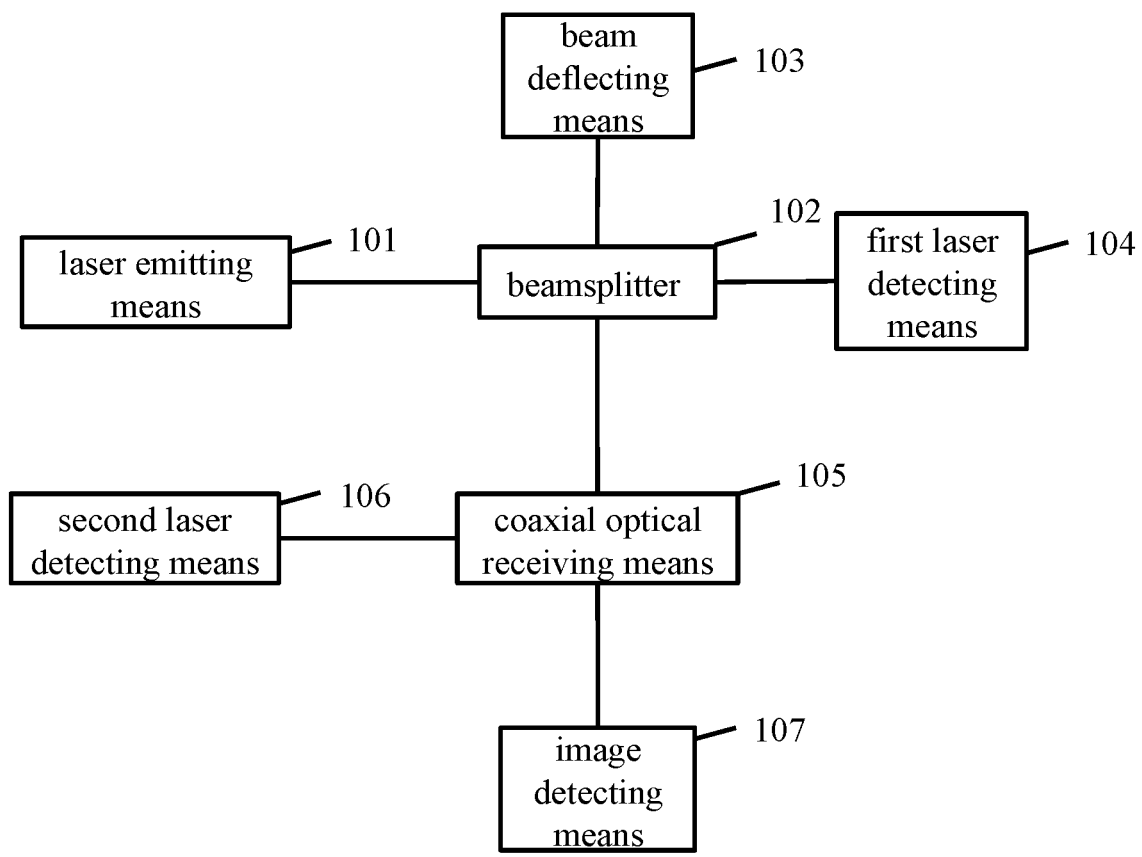
FIG. 1 is a schematic diagram showing a detecting system fusing lidar point cloud and image according to an exemplary embodiment.

| Reference list | |
|---|---|
| 101: laser emitting means | 102: beamsplitter |
| 103: beam deflecting means | 104: first laser detecting means |
| 105: coaxial optical receiving means | 106: second laser detecting means |
| 107: image detecting means | 108: light processing means |
| 1011: laser emitting device | 1012: laser shaping device |
| 1041: third lens component | 1042: first laser detector |
| 1051: first lens component | 1052: beamsplitter cube |
| 1061: second lens component | 1062: second laser detector |
| 1071: fourth lens component | 1072: image sensor |

DETAILED DESCRIPTION

Various exemplary embodiments, features and aspects of the present disclosure will be described in detail below with reference to the drawings. The same reference signs in the drawings represent the same or similar elements. Although various aspects of the embodiments are shown in the drawings, the drawings are not necessarily drawn to scale unless specifically noted.

The word "exemplary" as used herein means "serving as an example, embodiment or illustration". Any embodiment described herein as "exemplary" is not necessarily to be construed as superior or better than other embodiments.

In addition, in order to better illustrate the present disclosure, numerous specific details are given in the detailed description below. Those skilled in the art should understand that the present disclosure may be implemented without certain specific details. In some examples, methods, means, elements and circuits that are well known to those skilled in the art have not been described in detail so as to highlight the gist of the present disclosure.

FIG. 1 is a schematic diagram showing a detecting system fusing lidar point cloud and image according to an exemplary embodiment. As shown in FIG. 1, the system includes a laser emitting means 101, a beamsplitter 102, a beam deflecting means 103, a first laser detecting means 104, a coaxial optical receiving means 105, a second laser detecting means 106 and an image detecting means 107. The laser emitting means 101 emits a first laser beam to the beamsplitter 102. The beamsplitter 102 divides a first laser beam into a second laser beam and a third laser beam, the second laser beam traveling towards the beam deflecting means 103 and the third laser beam traveling towards the first laser detecting means 104. The beam deflecting means 103 deflects the direction of the second laser beam so as to travel towards the target object, and also deflects the first return light direction so as to travel towards the beamsplitter 102 and form a second return light after passing through the beamsplitter 102 which travels towards the coaxial optical receiving means 105. The first return light includes reflected light generated by the second laser beam irradiating the target object and reflected light generated by the background illuminating light source irradiating the target object, and the background illuminating light source includes one or more natural light sources (such as the sun) and/or artificial light sources (such as a laser, an electric lamp and a candle). The first laser detecting means 104 receives the third laser beam to generate initial light information. The coaxial optical receiving means 105 receives the second return light, wherein a part of the second return light is deflected by the coaxial optical receiving means 105 and forms a third return light, the third return light traveling towards the second laser detecting means 106, and another part of the second return light which passes through the coaxial optical receiving means 105 forms a fourth return light to travel towards the image detecting means 107. The second laser detecting means 106 receives the third return light from the coaxial optical receiving means 105 and generates reflected light information. The image detecting means 107 receives the fourth return light from the coaxial optical receiving means 105 and generates image information.

The laser emitting means 101 may be a means for emitting the first laser beam. The laser emitting means 101 may include a laser emitting device and a laser shaping device. The laser emitting device may be a laser diode, a laser diode array (such as a linear-array or an area-array), or a solid-state laser and the like. The laser shaping device may include one or more lenses and may shape the laser beam emitted by the laser emitting device so that the laser beam can meet actual needs, for example, the divergence angle of the laser beam can meet certain requirements.

In a possible implementation, the first laser beam is emitted by a pulsed laser.

The beamsplitter 102 may be a means for dividing the first laser beam emitted by the laser emitting means 101 into the second laser beam and the third laser beam. The second laser beam can travel towards the beam deflecting means 103 so that the second laser beam can travel towards the target object after being deflected by the beam deflecting means 103. The third laser beam can travel towards the first laser detecting means 104 so that the first laser detecting means 104 generates initial light information about the target object. In an example, the beamsplitter 102 can shape the light beam so that the laser beam can meet the actual needs, for example, the divergence angle of the laser beam can meet certain requirements (for example, the laser detecting field of view can coincide with the image detecting field of view, which will be described in detail below). It should be noted that a person skilled in the art may select the beamsplitter 102 according to actual conditions, for example, the beamsplitter 102 may be a curved beamsplitter and a surface of the curved beamsplitter facing the laser emitting means 101 may be a transflective surface.

The beam deflecting means 103 may be a means capable of deflecting a direction in which the light travels. In this embodiment, on one hand, the beam deflecting means 103 may deflect the direction of the second laser beam, so that the second laser beam can travel towards the target object and make the target object generate reflected light based on the second laser beam. On the other hand, the beam deflecting means 103 may deflect the direction of the first return light, so that the first return light can travel towards the beamsplitter 102 and forms a second return light after passing through the beamsplitter 102 which travels towards the coaxial optical receiving means 105. The first return light and the second return light may include reflected light generated by the second laser beam irradiating the target object and reflected light generated by the background illuminating light source irradiating the target object; the background illuminating light source may be a light source that may illuminate the background environment in which the target object is located by means of irradiating. For example, the background illuminating light source may include one or more natural light sources (such as the sun) and/or artificial light sources. The artificial light source may include one or more objects capable of emitting light other than the sun, for example, a powered-on lamp and a lit candle. In an example, the beam deflecting means 103 may be a planar mirror.

In a possible implementation, the beam deflecting means 103 includes a galvanometer scanner.

In a possible implementation, the beam deflecting means 103 includes a mechanical rotating mirror.

In a possible implementation, the beam deflecting means 103 includes an active mirror.

Using the galvanometer scanner, the mechanical rotating mirror or the active mirror as the beam deflecting means 103 may scan the target object so as to obtain more information about the target object. Below is an example of how to perform scanning.

The coaxial optical receiving means 105 may be a means that receives the second return light from the beamsplitter 102 and deflects a direction of a part of the light to form the third return light while does not deflect a direction of another part of the light to form the fourth return light. When the second return light reaches the coaxial optical receiving means 105, a part of the light is reflected and the direction is changed so as to form the third return light, and another part of the light directly passes through the coaxial optical receiving means 105 without changing the direction so as to form the fourth return light.

In an example, the coaxial optical receiving means 105 may include a first lens component and a beamsplitter cube. The first lens component may be disposed on a side close to the beamsplitter 102, and can adjust the second return light (for example, converge or diverge the second return light) so that the second return light travels towards the coaxial optical receiving means 105. It should be noted that those skilled in the art may flexibly set the positions of the first lens component and the beamsplitter cube according to actual conditions, which are not limited thereto. For example, by setting the position of the first lens component, the second return light after passing through the first lens component may be made into parallel light which travels towards the beamsplitter cube. The first lens component may be one or more lenses, and the beamsplitter cube may be a transflective beamsplitter cube or the like.

By using the coaxial optical receiving means, the third return light received by the second laser detecting means and the fourth return light received by the image detecting means are both from the first return light which includes the reflected light generated by the second laser beam irradiating the target object and the reflected light generated by the background illuminating light source irradiating the target object. In other words, the system may acquire the lidar point cloud information and image information synchronously, which facilitates the subsequent fusion of the lidar point cloud information and the image information and reduces the complexity of calculation.

The second laser detecting means 106 may be a means for receiving the third return light from the coaxial optical receiving means 105 to generate reflected light information. The lidar point cloud information can be generated based on the initial light information and the reflected light information. In an example, the second laser detecting means 106 may include a second lens component and a second laser detector. The second lens component may be disposed on a side close to the coaxial optical receiving means 105, and can adjust the third return light (for example, converge or diverge the third return light) so that the second laser detector receives the third return light. It should be noted that those skilled in the art may flexibly set the positions of the second lens component and the second laser detector according to the actual situation. For example, the second laser detector may be set at the focal position of the second lens component so that the third return light is received by the second laser detector after being focused by the second lens component. The second lens component may be one or more lenses, the second laser detector may be a photodiode or an avalanche photodiode, and the avalanche photodiode may be a linear-array or an area array, which are not limited thereto.

In an example, the second laser detector may respond to the wavelength of the reflected light generated by the second laser beam irradiating the target object (hereinafter referred to as laser reflected light), and may also respond to the wavelength of the reflected light generated by the background illuminating light source irradiating the target object (hereinafter referred to as reflected light of the background light). In another example, the second laser detector may respond to the wavelength of the laser reflected light but not respond to the wavelength of the reflected light of the background light. In this case, it may be considered that the second laser detector receives the laser reflected light and eliminates the influence of reflected light of the background light, which simplifies the calculation process of obtaining lidar point cloud information of the target object and further reduces the complexity of subsequent fusion calculation.

The first laser detecting means 104 may be a means for receiving the third laser beam from the beamsplitter 102 to generate initial light information. In an example, the first laser detecting means 104 may include a third lens component and a first laser detector. The third lens component may be disposed on a side close to the beamsplitter 102, and can adjust the third laser beam (for example, converge or diverge the third laser beam) so that the first laser detector receives the third laser beam. It should be noted that those skilled in the art may flexibly set the positions of the third lens component and the first laser detector according to the actual situation. For example, the first laser detector may be set at the focal position of the third lens component so that the third laser beam is received by the first laser detector after being focused by the third lens component. The third lens component may be one or more lenses; the first laser detector may be a photodiode or an avalanche photodiode which may be a linear array or an area array; and the first laser detector and the second laser detector may be the same or different, which are not limited thereto.

The lidar point cloud information about the target object may be calculated and obtained based on the initial light information generated by the first laser detecting means 104 and the reflected light information generated by the second laser detecting means 106. For example, for pulse lidar based on the time-of-flight method, the initial light information may include the laser pulse emission time, and the reflected light information may include the reflected echo pulse reception time. By multiplying the time difference $\Delta T$ between the emission time and the reception time by the light velocity C, the round-trip distance between the lidar and the target object can be calculated.

The image detecting means 107 may be a means for receiving the fourth return light from the coaxial optical receiving means 105 to form an optical image. In an example, the image detecting means 107 may include a fourth lens component and an image sensor. The fourth lens component may be disposed on a side close to the coaxial optical receiving means 105, and can adjust the fourth return light (for example, converge or diverge the fourth return light) so that the image sensor receives the fourth return light. It should be noted that those skilled in the art may flexibly set the positions of the fourth lens component and the image sensor according to the actual situation. For example, the image sensor may be set at the focal position of the fourth lens component so that the fourth return light is received by the image sensor after being focused by the fourth lens component. The fourth lens component may be one or more lenses, and the image sensor may be a charge-coupled device (CCD) and the like, which are not limited thereto.

In an example, the image sensor may respond to the wavelength of the laser reflected light, and may also respond to the wavelength of the reflected light of the background light. In this case, it may be considered that the image sensor works in an active detection mode of laser irradiation. The image sensor may be applied to a scene with a background lighting source, for example, daytime, or a scene without a background lighting source, for example, night. In another example, the image sensor may respond to the wavelength of the reflected light of the background light, but not respond to the wavelength of the laser reflected light. In this case, it may be considered that the image sensor receives the reflected light of the background light, excluding the influence of the laser reflected light, which simplifies the calculation process of obtaining image information of the target object and reduces the complexity of subsequent fusion calculation.

The present disclosure adopts a coaxial optical receiving means, so that the second laser detecting means receives the third return light based on the second return light to generate reflected light information while the image sensor receives the fourth return light based on the second return light to generate image information. The lidar point cloud information of the target object may be generated based on the initial light information received by the first laser detector and the reflected light information. Based on the lidar point cloud information and image information, 3D fusion image of the target object of high quality can be obtained without complicated image processing process.

In a possible implementation, the laser detecting field of view coincides with the image detecting field of view. The laser detecting field of view is a range of a target object that can be detected by the second laser detecting means 106, and the image detecting field of view is a range of a target object that can be detected by the image detecting means 107.

By overlapping the laser detecting field of view with the image detecting field of view, the complexity of subsequent fusion calculations based on lidar point cloud information and image information may be simplified. The fusion means generating a three-dimensional fusion image about a target object based on the lidar point cloud information and the image information.

In a possible implementation, by making the laser detecting field of view be coincided with the image detecting field of view, maintaining the relative positions of the second laser detecting means 106 and the image detecting means 107 constant, and calibrating the correspondence between a unit (which may also be understood as a pixel) of the second laser detector and a unit (which may also be understood as a pixel) of the image sensor in advance, it facilitates a subsequent direct registration of 3D lidar point cloud information and 2D image information and data fusion of both. The 3D lidar point cloud information and the 2D image information are directly registered, in other words, the 3D lidar point cloud information and the 2D image information may be registered in real time, which make the detecting system more time-effective and suitable for real-time application scenarios. The registration means matching of geographic coordinates of different image graphics in the same area obtained by different means. Those skilled in the art may realize the registration of the 3D lidar point cloud information and the 2D image information and perform data fusion of both by any known method, which are not limited thereto.

In a possible implementation, the laser emitting field of view may be greater than or equal to the laser detecting field of view and/or the image detecting field of view, and the laser emitting field of view is a range where the second laser beam is irradiated to the target object.

In a possible implementation, the laser emitting field of view may be greater than or equal to the larger one of the laser detecting field of view and the image detecting field of view.

By making the laser emitting field of view greater than or equal to the laser detecting field of view and/or the image detecting field of view, in other words, the range in which the second laser beam is irradiated to the target object greater than or equal to the range of the target object detectable by the second laser detecting means 106 and/or the range of the target object detectable by the image detecting means 107, the second laser detecting means 106 receives optimal third return light and/or the image detecting means 107 receives optimal fourth return light, which is beneficial to generate reflected light information and/or image information of high quality.

In a possible implementation, the second laser detecting means 106 includes a line-array laser detector, and the image detecting means 107 includes a line-array image sensor.

Compared to the area-array laser detector, the second laser detecting means 106 adopting a linear-array laser detector costs less, requires a smaller number of units performing process in subsequent stage and requires a lower processing capability on circuits and the like by.

If the second laser detecting means 106 includes a linear-array laser detector, and the scanning is performed in a direction perpendicular to arrangement direction the unit of the linear-array laser detector, a detection effect of the two-dimensional area-array laser detectors may be obtained by a one-dimensional array laser detector. In addition, the scanning method does not limit the number of units of the laser detector, and better detection results or higher lateral resolution may be obtained with a low cost.

Figure 2:
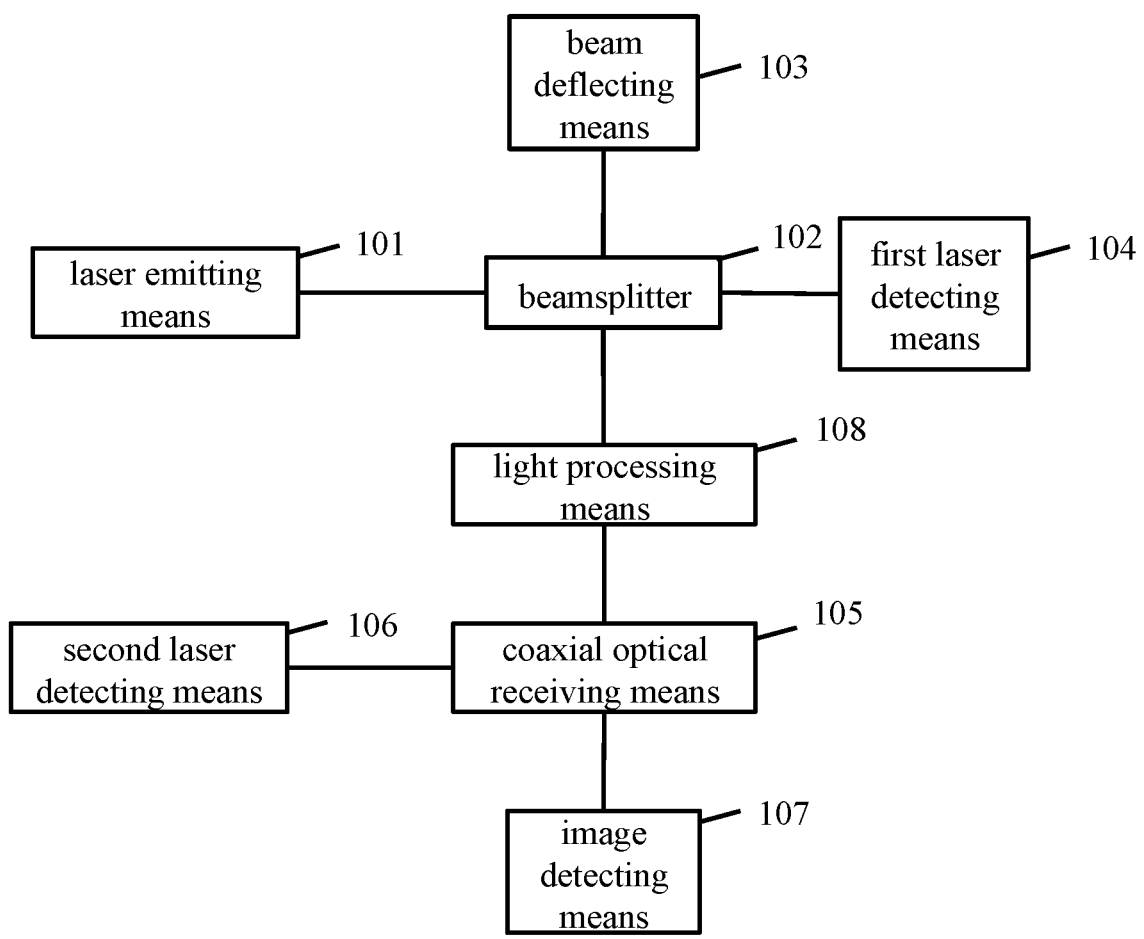
FIG. 2 is a schematic diagram showing a detecting system fusing lidar point cloud and image according to an exemplary embodiment.

FIG. 2 shows a detecting system fusing lidar point cloud and image according to an exemplary embodiment. On the basis of FIG. 1, the system may further include a light processing means 108 disposed between the beamsplitter 102 and the coaxial optical receiving means 105, which performs process on the second return light passing through the beamsplitter 102, including at least one of amplification, denoising and beam shaping.

The light processing means 108 may be a means for processing the second return light. The process on the second return light may include at least one of amplifying the light intensity of the second return light, performing noise-removal processing on the second return light, shaping the light beam of the second return light and the like.

In an example, the light processing means 108 may include an optical amplifier. Since the first return light is generated by diffuse reflection caused by irradiating the second laser beam and the background illuminating light source to the target object, and the second return light is formed by the first return light pass through the beamsplitter, it is usual that the intensity of the second return light is relatively small. By enlarging the intensity of the second return light, the intensity of the third return light and the fourth return light is enlarged, which facilitates detection of the third return light by the second laser detecting means 106 and detection of the fourth return light by the image detecting means 107.

In an example, the light processing means 108 may include a circuit for removing the noise. Since the first return light is generated by diffuse reflection caused by irradiating the second laser beam and the background illuminating light source to the target object, and the second return light is formed by the first return light passing through the beamsplitter, there may be useless interference light in the second return light. The noise-removal processing is performed on the second return light to facilitate detection of the third return light by the second laser detecting means 106 and detection of the fourth return light by the detecting means 107, which improves the accuracy of detection.

In an example, the light processing means 108 may include a beam shaping device.

Since the first return light is generated by diffuse reflection caused by irradiating the second laser beam and the background illuminating light source to the target object, the direction of the first return light being various, and the second return light is formed by the first return light passing through the beamsplitter, the direction of the second return light is various. By shaping the beam of the second return light, it facilitates the second return light to enter the coaxial optical receiving means 105, the subsequent detection of the third return light by the second laser detecting means 106 and the detection of the fourth return light by the image detecting means 107.

It should be noted that although the above description has been made by taking the light processing means 108 including an optical amplifier, a circuit for removing noise or a beam shaping device as an example respectively, those skilled in the art may design the structure of the light processing means 108 and the relative position of the processing means 108 with other means in the system according to the actual needs so as to improve the accuracy of detection, which are not limited thereto.

Figure 3:
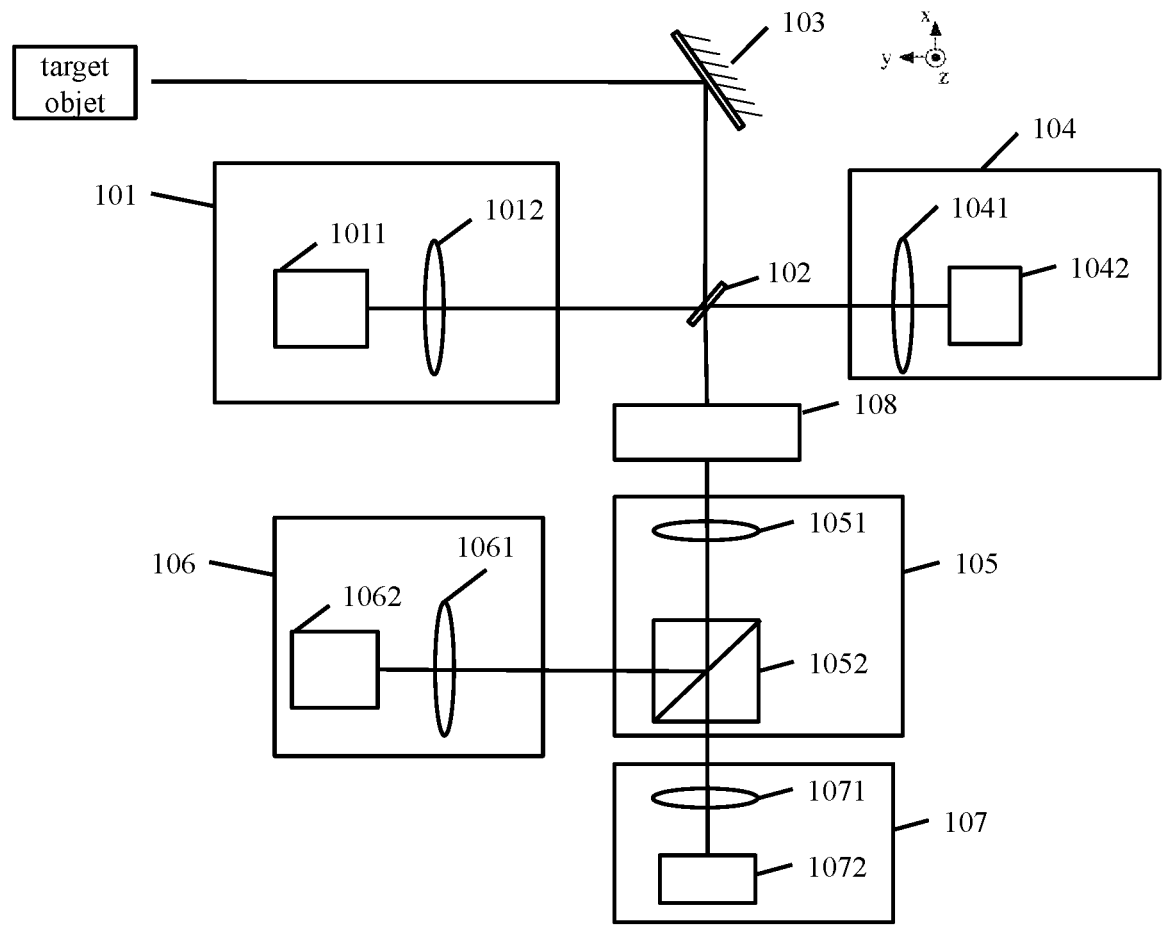
FIG. 3 is a schematic diagram showing a detecting system fusing lidar point cloud and image according to an exemplary embodiment.

FIG. 3 is a schematic diagram showing a detecting system fusing lidar point cloud and image according to an exemplary embodiment. As shown in FIG. 3, the system includes a laser emitting device 1011, a laser shaping device 1012, a beamsplitter 102, a beam deflecting means 103, a light processing means 108, a first lens component 1051, a beamsplitter cube 1052, a second lens component 1061, the second laser detector 1062, the third lens component 1041, the first laser detector 1042, the fourth lens component 1071 and the image sensor 1072.

FIG. 3 is only illustrated by taking the main light as an example, and related processing circuits, for example, processing circuit for the first laser detecting means, processing circuit for the second laser detecting means and processing circuit for the image detecting means are not shown. As shown in FIG. 3, the first laser beam emitted by the laser emitting device 1011 reaches the beamsplitter 102 after being shaped by the laser shaping device 1012, the beamsplitter 102 divides the first laser beam into a second laser beam and a third laser beam, the third laser beam is received by the first laser detector 1042 after passing through the third laser beam component 1041, and the second laser beam travels towards the target object after being deflected by the beam deflecting means 103. The first return light including the laser reflected light and the reflected light of the background light reaches the beamsplitter 102 after being deflected by the beam deflecting means 103; the first return light forms a second return light after passing through the beamsplitter 102 and travels towards the light processing means 108; the second return light travels towards the first lens component 1051 after being processed by the light processing means 108, and reaches the beamsplitter cube 1052 after passing through the first lens component 1051; when the second return light reaches the beamsplitter cube 1052, a part of the light is reflected by the beamsplitter cube 1052 to form a third return light which is received by the second laser detector 1062 after passing through the second lens means 1061, and another part of the light directly passes through the beamsplitter cube 1052 to form a fourth return light which is received by the image sensor 1072 after passing through the fourth component 1071. The lidar point cloud information about the target object may be obtained based on the initial light information generated by the first detector 1042 and the reflected light information generated by the second detector 1062, and high-quality 3D fusion image of the target object may be obtained based on the lidar point cloud information and image information generated by the image sensor 1072.

Figure 4:
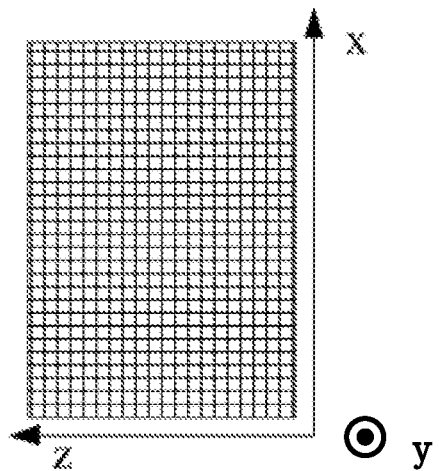
FIG. 4 is a schematic scanning area diagram of a detecting system fusing lidar point cloud and image according to an exemplary embodiment.

The laser emitting device 1011 may be a pulsed laser diode linear-array; the beamsplitter 102 may be a curved beamsplitter; the beam deflecting means 103 may be a rotatable planar mirror; the light processing means 108 may perform processing such as amplifying and denoising the second return light; the beamsplitter cube 1052 may be a transflective beamsplitter cube; the second laser detector may be a laser detector responsive to laser reflected light, for example, the wavelength of the second laser beam may range 850 nm-1600 nm, and the second laser detector may respond to light having a wavelength of 800 nm or more; and the image sensor responds to visible light. In the present example, the x-y-z three-dimensional system of coordinate is defined, with the z-axis direction perpendicular to the paper plane outwards, the x-axis direction along the paper plane upwards and the y-axis direction along the paper plane leftwards; the second laser detector 1062 is a linear-array laser detector in which the units are arranged in the z-axis direction; the image sensor 1072 is a linear-array image sensor in which the units are arranged in the z-axis direction. The plane mirror may be rotated around the z-axis to achieve scanning in the x-y plane. FIG. 4 is a scanning area schematic diagram of a detecting system fusing lidar point cloud and image according to an exemplary embodiment. By adopting this scanning method, the detection result of the second laser detector being an area array laser detector may be realized. It reduces the cost and decreases the demands for the processing capacity of a circuit in the subsequent stage. In a possible implementation, the detecting system fusing lidar point cloud and image are placed on a turntable capable of rotating around the z-axis, which can also achieve the effect of scanning similarly to the foregoing method using rotation of the planar mirror.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present disclosure.

What is claimed is:

1. A detecting system fusing lidar point cloud and image, comprising:
   a laser emitting means configured to emit a first laser beam to a beamsplitter;
   the beamsplitter configured to divide the first laser beam into a second laser beam and a third laser beam, the second laser beam traveling towards a beam deflecting means and the third laser beam traveling towards a first laser detecting means;
   the beam deflecting means configured to deflect a direction of the second laser beam so that the second laser beam travels towards a target object, and further configured to deflect a direction of a first return light so that the first return light travels towards the beamsplitter, passes through the beamsplitter and forms a second return light which travels towards a coaxial optical receiving means, wherein the first return light includes a reflected light generated by the second laser beam irradiating the target object and a reflected light generated by a background illuminating light source irradiating the target object, and the background illuminating light source includes one or more natural light sources and/or artificial light sources;
   the first laser detecting means configured to receive the third laser beam and generate initial light information;
   the coaxial optical receiving means configured to receive the second return light, a part of which is deflected by the coaxial optical receiving means and forms a third return light which travels towards a second laser detecting means, and another part of which passes through the coaxial optical receiving means and forms a fourth return light which travels towards an image detecting means;
   the second laser detecting means configured to receive the third return light from the coaxial optical receiving means and generate reflected light information; and
   the image detecting means configured to receive the fourth return light from the coaxial optical receiving means and generate image information,
   wherein a laser detecting field of view coincides with an image detecting field of view,
   the laser detecting field of view is a range of the target object detectable by the second laser detecting means, and
   the image detecting field of view is a range of the target object detectable by the image detecting means.

2. The system according to claim 1, wherein the coaxial optical receiving means includes a beamsplitter cube, a part of the second return light being deflected by the beamsplitter cube and forming the third return light, and another part of the second return light passing through the beamsplitter cube and forming the fourth return light.

3. The system according to claim 1, further comprising:
   a light processing means provided between the beamsplitter and the coaxial optical receiving means and configured to perform processing on the second return light passing through the beamsplitter, wherein the processing includes at least one of amplification, denoising and beam shaping.

4. The system according to claim 3, wherein the beam deflecting means includes a galvanometer scanner.

5. The system according to claim 3, wherein the beam deflecting means includes a mechanical rotating mirror.

6. The system according to claim 3, wherein the beam deflecting means includes an active mirror.

7. The system according to claim 1, wherein
   a laser emitting field of view is greater than or equal to the laser detecting field of view and/or the image detecting field of view, and the laser emitting field of view is a range where the second laser beam is irradiated to the target object.

8. The system according to claim 1, wherein the first laser beam is emitted by a pulsed laser.

9. The system according to claim 1, wherein the second laser detecting means includes a linear-array laser detector, and the image detecting means includes a linear-array image sensor.

* * * * *